L. R. STEEL.
HEAT INSULATED CAN.
APPLICATION FILED JULY 20, 1910.
1,067,071.
Patented July 8, 1913.
2 SHEETS—SHEET 1.
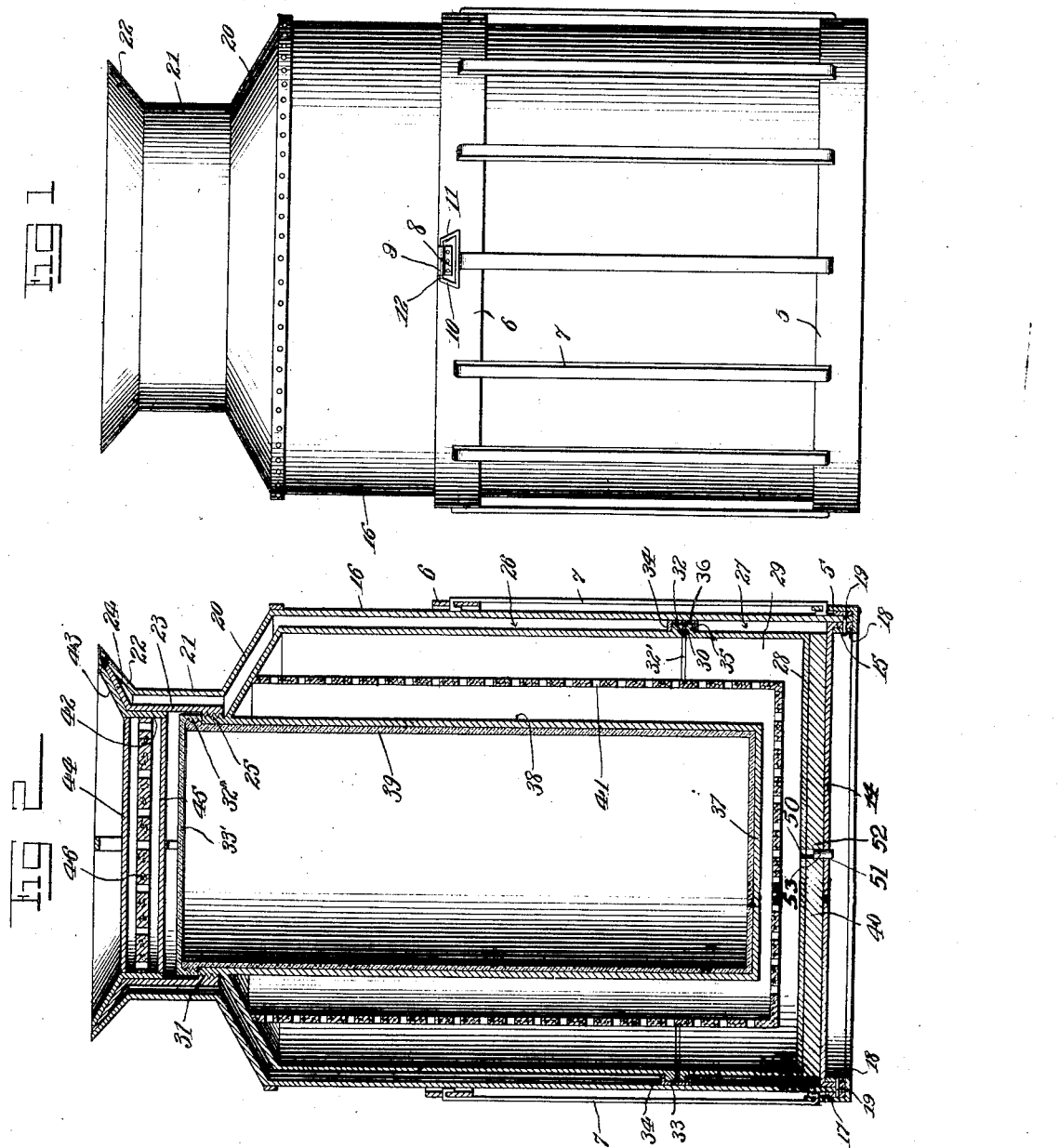
Witnesses
J. E. Crawford
John M. Dugan
Inventor
Leonard R. Steel
By Victor J. Evans
Attorney L. R. STEEL.
HEAT INSULATED CAN.
APPLICATION FILED JULY 20, 1910.
1,067,071.
Patented July 8, 1913.
2 SHEETS—SHEET 2.
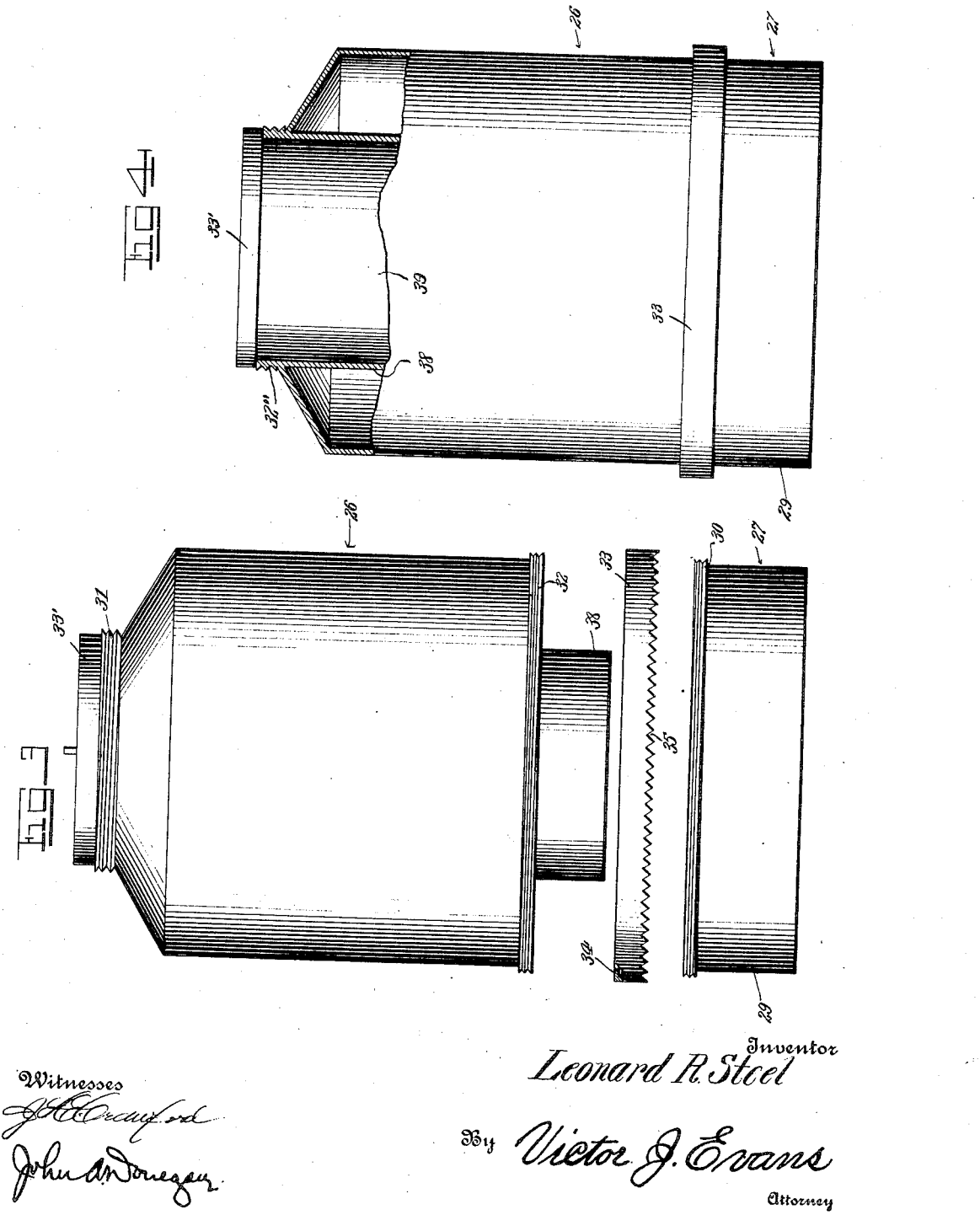
Witnesses
Inventor
Leonard R. Steel
By Victor J. Evans
Attorney

UNITED STATES PATENT OFFICE.

LEONARD R. STEEL, OF CLEVELAND, OHIO.

HEAT-INSULATED CAN.

1,067,071.

Specification of Letters Patent.

Patented July 8, 1913.

Application filed July 20, 1910. Serial No. 572,898.

*To all whom it may concern:*

Be it known that I, LEONARD R. STEEL, a citizen of the United States, residing at Cleveland, in the county of Cuyahoga and State of Ohio, have invented new and useful Improvements in Heat-Insulated Cans, of which the following is a specification.

This invention relates to improvements in milk cans and has for one of its objects the provision of a device of that kind including an outer and inner receptacle arranged in spaced relation and a double-walled vessel arranged in the space between said receptacles, said double-walled receptacle preventing the milk within the inner receptacle from absorbing the heat of the atmosphere without the employment of a refrigerating medium.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming part of the specification;—Figure 1 is a side elevation of the device. Fig. 2 is a vertical sectional view of the same. Fig. 3 is a detail side elevation of the vacuum vessel showing the sections thereof in spaced relation. Fig. 4 is a similar view showing the vacuum receptacle connected with the inner receptacle.

Similar numerals of reference are employed to designate corresponding parts throughout.

As shown in Fig. 1 the can is arranged within a crate, the said crate including a lower circular member 5 and an upper circular member 6, the said circular members being held in spaced relation by means of slats 7. Arranged at diametrically opposite points on the upper circular section 6 are a pair of plates, one of which is shown in Fig. 1 and designated by the numeral 8, the said plate having an outwardly bulged central portion 9. The handle is preferably formed of a single piece of stout steel wire or its equivalent bent into substantially a U-shape, the opposite limbs of which are designated by the numerals 10 and 11, the limbs 10 and 11 terminating in bent portions 12 which are received by the opposite ends of the bent portion 9. With this construction it will be seen that the handle is free to swing in a vertical plane when the crate is in an upright position.

The outer casing is shown to include a circular bottom 14, from the periphery of which depends a flange 15. The body portion of the outer receptacle is designated by the numeral 16 and is preferably formed of a single piece of sheet metal rolled into the shape of a hollow cylinder. The lower end portion of the body 16 receives the bottom, its inner face bearing on the outer face of the flange 15. The bottom is secured in position and held braced by means of circular bands 17 and 18, one of which is arranged on the inner surface of the flange 15 and the other on the outer surface at the lower end of the body portion 16, the said bands and body portion 16 having alining openings for the reception of rivets 19. The upper end of the body portion 16 is provided with a dome-shaped head 20 having a central opening from which rises a neck 21, the said neck 21 terminating in an outwardly-flared mouth 22. Arranged within the neck 21 is an inner neck 23, the upper end portion of which is outwardly-flared as shown at 24 and secured to the edge of the flared portion 22, the lower end portion of the inner neck 23 being interiorly screw-threaded as shown at 25.

The double-walled receptacle comprises a pair of sections designated by the numerals 26 and 27. The lower of these sections 27 is somewhat less in length than the upper section 26, and includes a bottom 28 and circular side wall 29, the upper edge of the circular side wall 29 being flexed outwardly, as shown at 30. The upper section 26 of the double-walled receptacle is contracted at its upper end to form a neck 31, the said neck being externally screw-threaded. The lower end portion of the upper receptacle 26 is exteriorly screw-threaded as shown at 32, the said lower end portion bearing on the outwardly-flexed portion 30 of the lower section 27 and corresponding in diameter approximately to the diameter of the outwardly-flexed portion 30. A gasket 32 of any suitable non-heat-conducting substance is arranged on the outwardly-flexed portion 30, to prevent the entrance of air to the double-walled receptacle when the sections thereof are connected. The coupling ring is designated in general by the numeral 33. This member is provided at one end with an inwardly extending flange 34, while its opposite end is provided with a plurality of bendable prongs 35. When the sections 26 and 27 are arranged one upon the other, the ring 33 is placed over the upper section, and turned until the threads on its inner surface engage with the threads 32 of the upper section 26 and the threads 36 at the upper end of the lower section 27. The flange 34 of the collar bears on the threaded portion 32 of the upper section 26, while the prongs 35 are bendable into engagement with the lower section 27 at a point below the threaded portion 30 of the latter.

The inner receptacle wall of the double-walled receptacle comprises a hollow cylinder, the bottom of which is designated by the numeral 37, and the side wall thereof which rises from the said bottom 37 being designated by the numeral 38. The bottom 37 of the wall 38 is spaced from the bottom 28.

Arranged within the inner wall of the double-walled receptacle is the inner receptacle or lining designated by the numeral 39. This member may be of glass, earthenware or any other analogous substance and is somewhat greater in length than the length of the inner wall, its upper end portion extending beyond the upper end portion of the neck 31 and being exteriorly screw-threaded, as shown at 32″ to receive a screw-threaded cap 33′.

The double-walled receptacle is arranged within the outer casing, the external screw-threads of the neck 31 engaging with the screw-threaded portion 25 of the neck 23 of the outer receptacle. It will be seen now by reference to Fig. 1 that when the double-walled receptacle is arranged within the outer receptacle that a space will exist between the bottom of the outer receptacle and bottom 28 of the double-walled receptacle, and arranged in the space between the said bottoms is a buffer disk 40. The buffer disk acts to absorb the shock which may be transmitted to the bottom of the can when handling the can in transit. This buffer may be constructed of cork or like elastic material.

Arranged in the space between the outer and inner walls of the double-walled receptacle is a cylinder 41, of cork, asbestos, or any other non-heat-conducting substance. This non-heat conducting substance is of thin sheet form. It is suitably perforated and the substance forms a guard to protect the receptacle 39 should the walls of the vacuum vessel become punctured.

The cover for the outer receptacle is shown to comprise a neck 42, of a size to snugly fit within the inner neck 23 of the outer receptacle, said neck 42 terminating in a flared head 43 of a size to snugly fit within the flared portion 24 of the inner neck 23. Arranged in the flared portion 43 of the cover are a pair of spaced disks 44 and 45, the compartment formed by said disks having the air exhausted therefrom and arranged in said compartment is a disk 46 of cork, asbestos or other non-heat-conducting substance. In order to further prevent the absorption of heat by the milk in the inner receptacle, the inner surface of the inner wall of the double-walled receptacle is coated with mercury or similar substance, this coating acting as a reflector. Alining openings 50, 51 and 52 are formed in the walls 14 and 28 and in the cushion 40 by means of which air may be exhausted from the space defined by the walls of the double-walled receptacle. These openings may be sealed in any suitable well known manner by a plug 53.

I claim:—

A can, comprising an outer vessel, an intermediate double-walled receptacle including an upper section and a lower section, means for detachably connecting the sections together, the upper section having a substantially cylinder-like inner portion and an outer wall, the outer wall of the said upper section being spaced from the cylinder-like portion, the cylinder-like portion being extended below the plane of the outer wall of the upper section, a heat insulating element interposed between the cylinder-like portion and the outer wall of the upper section and extended below the plane of the outer wall of the upper section, whereby to be exposed when the upper and lower sections of the can are disconnected from each other, an inner vessel removably mounted in the cylinder-like portion of said double-walled receptacle, a closure for the inner vessel, and a closure for the outer vessel.

In testimony whereof I affix my signature in presence of two witnesses.

LEONARD R. STEEL.

Witnesses:
 MABEL LAWRENCE,
 JOHN D. LLOYD.